United States Patent
Heger et al.

(10) Patent No.: US 9,272,676 B2
(45) Date of Patent: Mar. 1, 2016

(54) METHOD FOR DETECTING A WET ROAD

(75) Inventors: Thomas Heger, Leonberg (DE); Michael Helmle, Esslingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 222 days.

(21) Appl. No.: 13/993,974

(22) PCT Filed: Dec. 2, 2011

(86) PCT No.: PCT/EP2011/071628
§ 371 (c)(1),
(2), (4) Date: Aug. 29, 2013

(87) PCT Pub. No.: WO2012/080005
PCT Pub. Date: Jun. 21, 2012

(65) Prior Publication Data
US 2013/0332028 A1  Dec. 12, 2013

(30) Foreign Application Priority Data
Dec. 14, 2010  (DE) .......................... 10 2010 063 017

(51) Int. Cl.
*B60W 40/06* (2012.01)
*B60R 16/023* (2006.01)
*B60Q 1/08* (2006.01)
*G06K 9/00* (2006.01)

(52) U.S. Cl.
CPC ............ *B60R 16/0237* (2013.01); *B60Q 1/085* (2013.01); *G06K 9/00791* (2013.01); *B60Q 2300/312* (2013.01)

(58) Field of Classification Search
CPC ........... B60R 16/0237; G06K 9/00791; B60Q 1/085; B60Q 2300/312
See application file for complete search history.

(56) References Cited

U.S. PATENT DOCUMENTS

| | | | | |
|---|---|---|---|---|
| 5,992,162 A | * | 11/1999 | Heinle | B60H 1/00785 15/250.001 |
| 2002/0135468 A1 | * | 9/2002 | Bos | B60N 2/002 340/436 |
| 2005/0007054 A1 | * | 1/2005 | Kim | B60S 1/0818 318/483 |
| 2005/0102083 A1 | * | 5/2005 | Xu | B60R 21/0132 701/70 |
| 2005/0171674 A1 | * | 8/2005 | Wang | B60K 31/04 701/93 |
| 2007/0016354 A1 | * | 1/2007 | Engel | B60T 8/172 701/80 |

(Continued)

FOREIGN PATENT DOCUMENTS

| | | |
|---|---|---|
| DE | 101 497 68 | 4/2003 |
| DE | 103 16 794 | 11/2004 |

(Continued)

OTHER PUBLICATIONS

International Search Report, PCT International Application No. PCT/EP2011/071628, dated Mar. 5, 2012.

*Primary Examiner* — Jonathan M Dager
(74) *Attorney, Agent, or Firm* — Kenyon & Kenyon LLP

(57) ABSTRACT

Methods in a driver assistance system of a vehicle for detecting wetness on a road surface as well as a corresponding driver assistance system having a rearview camera are described. The method may include the following: recording an image of an area located behind the rear end of the vehicle, using the rearview camera; evaluating the recorded image for the presence of a spray trail caused by the vehicle; and selectively outputting, based on the evaluation, a wetness signal for triggering an automatic response by the driver assistance system to the wet road surface.

9 Claims, 3 Drawing Sheets

(56) References Cited

U.S. PATENT DOCUMENTS

| | | | |
|---|---|---|---|
| 2008/0027607 A1* | 1/2008 | Ertl | B60W 40/06 701/36 |
| 2008/0059054 A1* | 3/2008 | Yamada | G01C 21/00 701/301 |
| 2008/0147277 A1* | 6/2008 | Lu | B60W 30/085 701/45 |
| 2009/0046894 A1 | 2/2009 | Robert et al. | |
| 2009/0093927 A1* | 4/2009 | Mueller-Schneiders | B60R 16/0232 701/36 |
| 2011/0221372 A1* | 9/2011 | Teder | B60S 1/0803 318/446 |
| 2012/0013741 A1* | 1/2012 | Blake, III | B60R 11/00 348/148 |
| 2014/0094989 A1* | 4/2014 | Dadu | G08G 1/0962 701/1 |
| 2014/0222272 A1* | 8/2014 | Raste | B60T 8/1755 701/22 |
| 2014/0233805 A1* | 8/2014 | Faber | G01W 1/00 382/104 |
| 2014/0265980 A1* | 9/2014 | Kracker | G06K 9/00791 318/483 |
| 2015/0019094 A1* | 1/2015 | Larkin | B60K 23/08 701/65 |

FOREIGN PATENT DOCUMENTS

| | | |
|---|---|---|
| DE | 10 2008 011 699 | 9/2008 |
| DE | 10 2009 030 431 | 2/2010 |
| EP | 0 443 185 | 8/1991 |
| JP | 2007-322231 | 12/2007 |
| JP | 2009-035067 | 2/2009 |

* cited by examiner

METHOD FOR DETECTING A WET ROAD

FIELD

The present invention relates to a method in a driver assistance system of a vehicle for detecting wetness on a road surface as well as a corresponding driver assistance system.

BACKGROUND INFORMATION

A driver assistance system provides one or multiple accessory equipment items in a vehicle to support the driver in certain driving situations. Such additional equipment includes, for example, an ABS (antilock brake system), an ESP (electronic stability program), an ACC (adaptive cruise control) or a parking assistance system.

The use of a rain sensor for automatic activation of the windshield wipers of a vehicle when it is raining belongs to the area of driver assistance. In this regard, German Patent No. DE 103 16 794 A1 describes a rain sensor which includes a camera. The camera is directed from the interior at an object fixedly mounted on the vehicle in front of the windshield, for example, the hood of the vehicle. The image recorded by the camera is compared with a stored image recorded when the windshield was dry. The presence of moisture, e.g., in the form of droplets on the windshield, is detected by comparing the images.

However, the rain sensor described above has the disadvantage that it generally responds only to rain. If it is not raining (any longer), the rain sensor will consequently detect dryness. Such a sensor may be used to control the windshield wiper but it can hardly be used appropriately to control other components of the vehicle in which an adaptation to moisture in the surroundings of a vehicle would be meaningful. For example, automatic control in response to a wet road surface cannot be derived from the rain sensor data: the road surface might still be wet or might already be wet even if it is not raining at the moment.

German Patent No. DE 101 497 68 A1 describes a method for determining the visual range of a laser scanner mounted on a front side of a vehicle. A sensor receives radiation emitted by the scanner into a monitoring area in front of the vehicle and then reflected from there. An evaluation unit evaluates the reflected radiation. Interference such as rain fog or spray from a preceding vehicle is detected. Measures are then taken in response to this detection. These measures may include, for example, intervention into operation of the vehicle, for example, by reducing the instantaneous vehicle speed or a predefined maximum speed.

The scanner described above provides information about wetness which might be present on the road more reliably than does a rain sensor. However such a system is complex and is therefore expensive.

SUMMARY

According to the present invention, an example method used in a driver assistance system of a vehicle is provided for detecting wetness on a road surface, in which the driver assistance system has a rearview camera. This example method includes the following steps: recording an image of an area behind the rear end of the vehicle using the rearview camera; evaluating the recorded image for the presence of a spray trail caused by the vehicle; and selective output, based on the evaluation, of a wetness signal for triggering an automatic response of the driver assistance system to the wet road surface.

The road surface should be understood to include all types of paved and unpaved surfaces on which the vehicle in question is able to travel. The automatic response triggered by a positive identification may be, for example, automatic activation or deactivation of the windshield wipers of the vehicle. In addition or alternatively, the automatic response may relate to activation or deactivation of the vehicle headlights. Depending on the statutory provisions, a rear fog light may also be turned on or off based on the wetness signal. The wetness signal may be used to control (open or close) the windows of the vehicle. The wetness signal may be used to trigger an air-conditioning system, which may be reconfigured in response to the detection of a wet road surface in order to keep the vehicle windows free of condensation.

The wetness signal may be used additionally or alternatively for automatic triggering of one or multiple subsystems of the driver assistance system to orient them toward a wet or dry road surface. In particular, vehicle dynamics control systems, i.e., electronic stability controls, may be used for this purpose, such as a highly developed ABS, a TCS (traction control system), an ESP, an EBA (electronic brake assist), etc.

The automatic response may additionally or alternatively also include the output of a warning to the driver that the road surface wetness has exceeded a predefined threshold value, for example. A warning of possible hydroplaning would be one example of such an automatic response.

The recording and/or the evaluation of the image may be carried out in response to a detection of an event, for example, reaching a regular time mark. In one example, an image from the rearview camera is evaluated at regular intervals of one minute. As an additional or alternative condition, positive detection of a forward movement of the vehicle may be necessary. In addition, a predetermined minimum speed of 30 kilometers per hour, for example, may be provided, below which no images are recorded and/or evaluated for the presence of a spray trail. Additionally or alternatively, an image may also be recorded and/or evaluated only when a rain sensor, which is additionally present, has detected rain or moisture on the windshield, for example.

The presence of a spray trail caused by the vehicle is detected by evaluation of the image or by evaluation of a sequence of images in chronological order. Corresponding image evaluation algorithms may be based on the fact that, for example, a spray trail only partially fills out the field of vision of a rearview camera, i.e., has a local extent, in contrast with fog or rain, for example: these phenomena affect the entire image. Another characteristic of a spray trail in contrast with fog or rain, for example, is the dynamic (i.e., highly variable over time) extent, shape and/or contour of the spray trail. Furthermore, it is also possible to detect a spray trail based on its extent, shape and/or contour, which depend on the speed of the vehicle.

In certain specific embodiments of the present invention, a wetness signal is output only when there is a corresponding signal from a rain sensor, which has detected the presence of rain (for example, on the basis of moisture on the windshield) in addition to a corresponding evaluation of the image recorded by the rearview camera.

A rearview camera is used in the methods according to the present invention described here. Alternatively, however, a front camera, which is directed at an area in front of the vehicle to detect the presence of a spray trail in the case of a preceding vehicle, may also be used. The image evaluation algorithms would have to be adjusted accordingly.

According to the present invention, a computer program is also proposed, in which one of the methods described here is carried out when the computer program is executed on a programmable computer system. This computer system may be, for example, a module for implementing a feature or a subsystem of a driver assistance system in a vehicle. The computer program may be stored on a machine-readable memory medium, for example, on a permanent or rewriteable memory medium or in allocation to a computer system or on a removable CD-ROM, DVD or a USB stick. Additionally or alternatively, the computer program may be provided for downloading on a computer system, e.g., via a data network such as the Internet or a communication link such as a telephone line or a wireless connection.

According to the present invention, a driver assistance system in a vehicle is also proposed, this system being designed to detect wetness on a road surface and including the following components: a rearview camera for recording an image of an area located behind the rear end of the vehicle; a component for evaluating the recorded image for the presence of a spray trail caused by the vehicle; and a component for selective output, based on the evaluation, of a wetness signal for triggering an automatic response of the driver assistance system to the wet road surface.

In accordance with an example embodiment of the present invention, a rearview camera be used for detecting wetness on a road surface. This has the advantage that it eliminates the need for installation of extra components such as a laser scanner, for example, to be provided for this purpose. A rearview camera is present anyway in an increasing number of vehicles in conjunction with a parking assistant, for example.

The field of vision of a rearview camera shows the vehicle's own spray trail comparatively prominently without filling out the entire image area. Thus, a detection here should be more reliable than, for example, a detection of a more distant spray trail from a preceding vehicle, for example, so even smaller spray trails are detectable with less moisture on the road and/or at a lower speed. It is also possible to provide graduations in the response to spray trails of different intensities, i.e., to carry out a gradual adjustment of vehicle components to the situation.

If a rain sensor does not respond because it is not raining at that moment in that position of the vehicle, the road surface may nevertheless be wet (a road surface may also be wet for other reasons, for example, during a thaw). An adjustment of a highly developed ABS or ESP in adjustment to the wet road surface based on data from one rain sensor is therefore impossible. With the example embodiment of the present invention, however, wetness stirred up from the road surface and therefore actually present on the road surface is detected by the ego vehicle (instead of detecting only the presence/absence of moisture on a windshield) and thus it is advantageously possible to trigger a component, such as ABS or ESP, which relates to vehicle safety.

Since no additional hardware components are needed in most cases, the present invention may be implemented comparatively easily and inexpensively. The present invention may also be used together with a rain sensor for controlling certain driver assistance systems, thereby increasing the reliability in detection of moisture in the vehicle surroundings.

BRIEF DESCRIPTION OF THE DRAWINGS

Additional aspects and advantages of the present invention are described in greater detail with reference to the figures.

DETAILED DESCRIPTION OF EXAMPLE EMBODIMENTS

Figure 1:
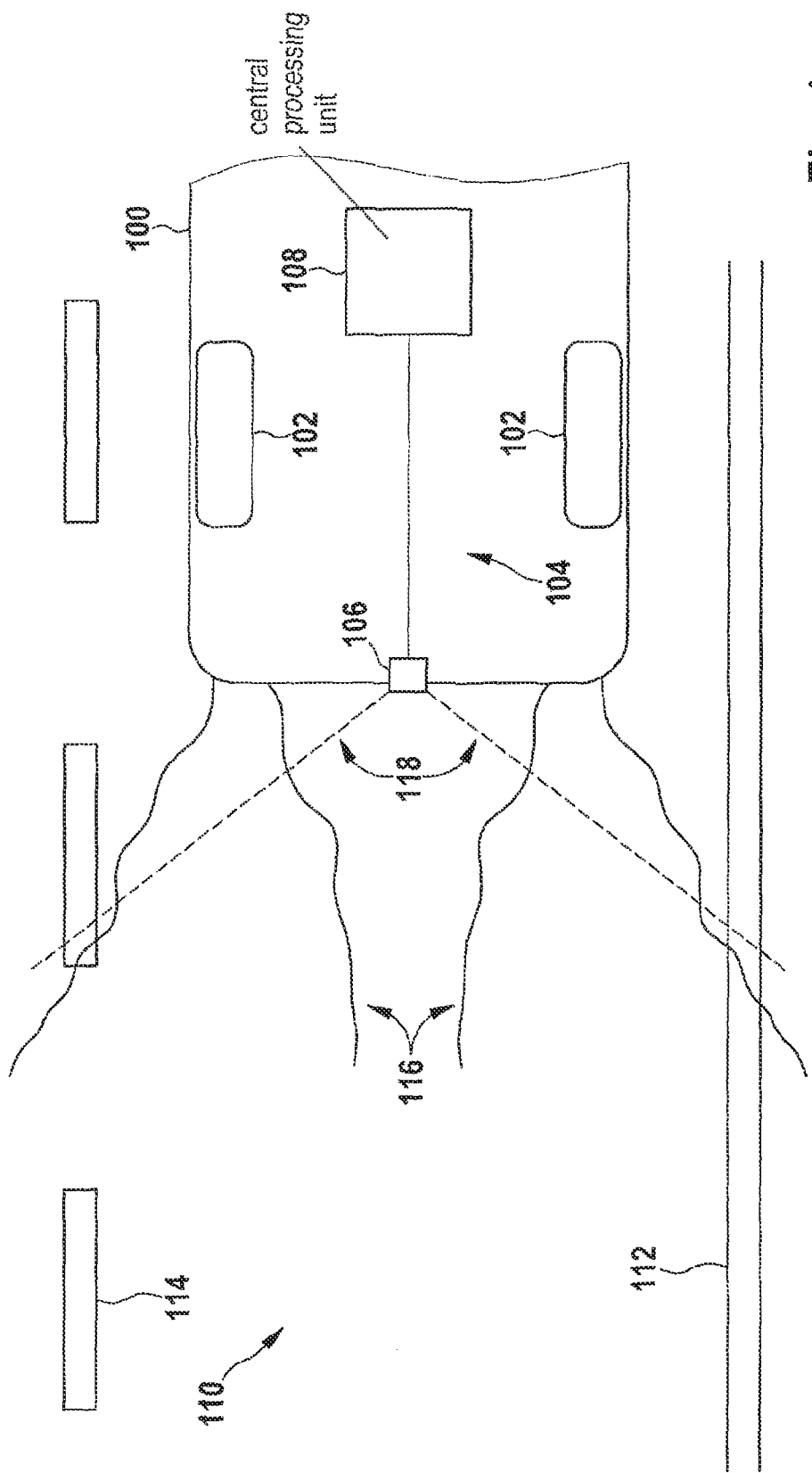
FIG. 1 shows a vehicle equipped with a driver assistance system according to an example embodiment of the present invention in an exemplary driving situation.

FIG. 1 shows the rear end of a vehicle 100 having rear wheels 102 indicated schematically. Vehicle 100 is equipped with a driver assistance system 104 designed according to the present invention which includes, among other things, a rearview camera 106 and a central processing unit 108, which is implemented as an ECU (electronic control unit). Vehicle 100 travels on a road surface 110, which is indicated by a side border 112 and lane markings 114. Each rear wheel 102 of vehicle 100 produces a spray trail 116 due to the wetness on road surface 110, the parts of this spray trail being detected in the field of vision 118 of rearview camera 106.

Figure 2:
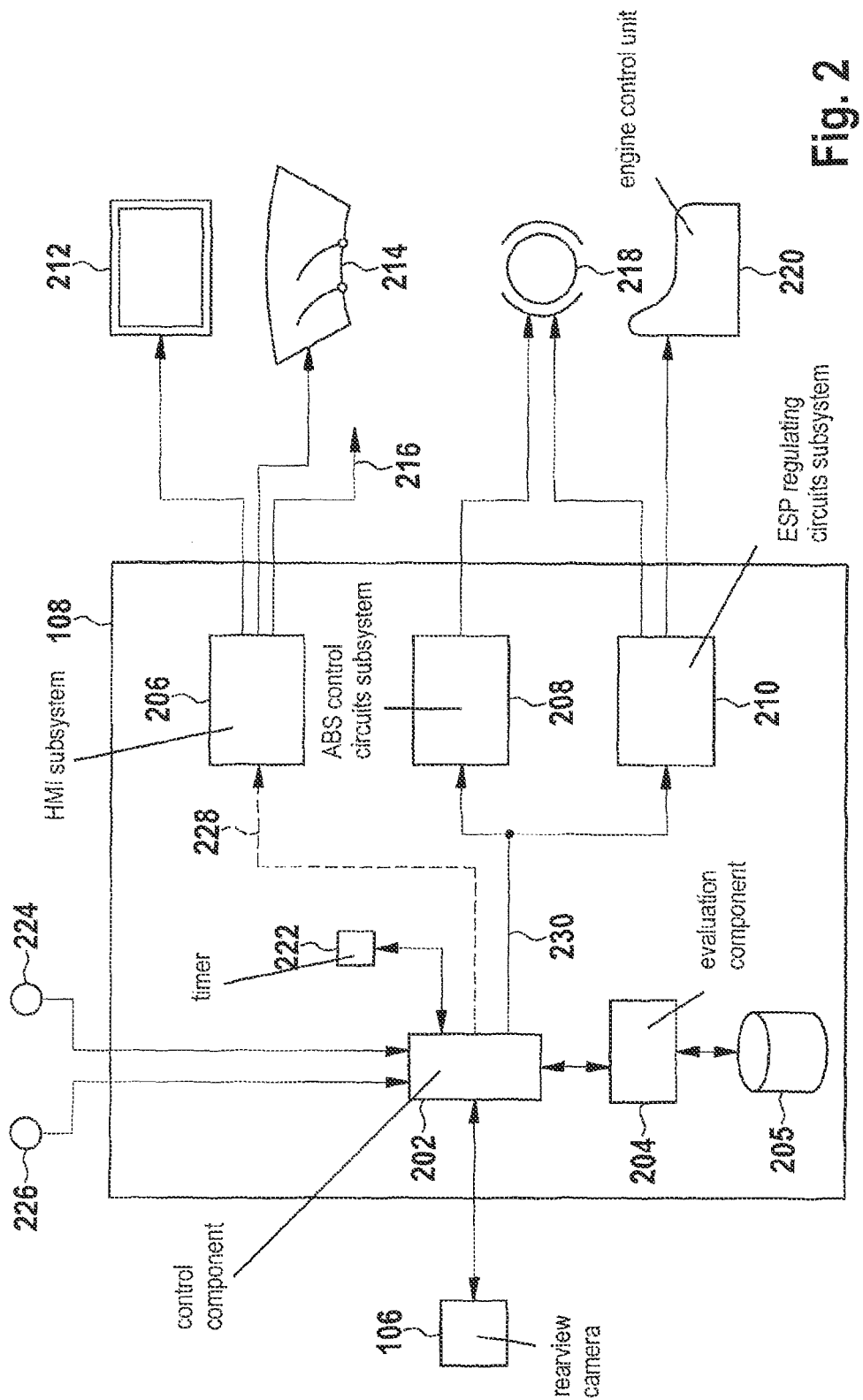
FIG. 2 shows a schematic diagram of functional components of the driver assistance system from FIG. 1.

In FIG. 2, functional components of ECU 108 of driver assistance system 104 are indicated. ECU 108 includes a control component 202, an evaluation component 204 and subsystems 206, 208 and 210. In the example shown in FIG. 2, subsystem 206 controls an HMI (human-machine interface) in the form of a display 212, windshield wipers 214 as well as additional vehicle systems such as headlights and/or an air-conditioning system, indicated by arrow 216. Subsystem 208 includes, for example, ABS control circuits, which trigger a braking system 218 of vehicle 100 in a generally conventional manner. Subsystem 210 includes regulating circuits for an ESP, for example, which also deliver signals to an engine control unit 220 in addition to brake control 218.

Figure 3:
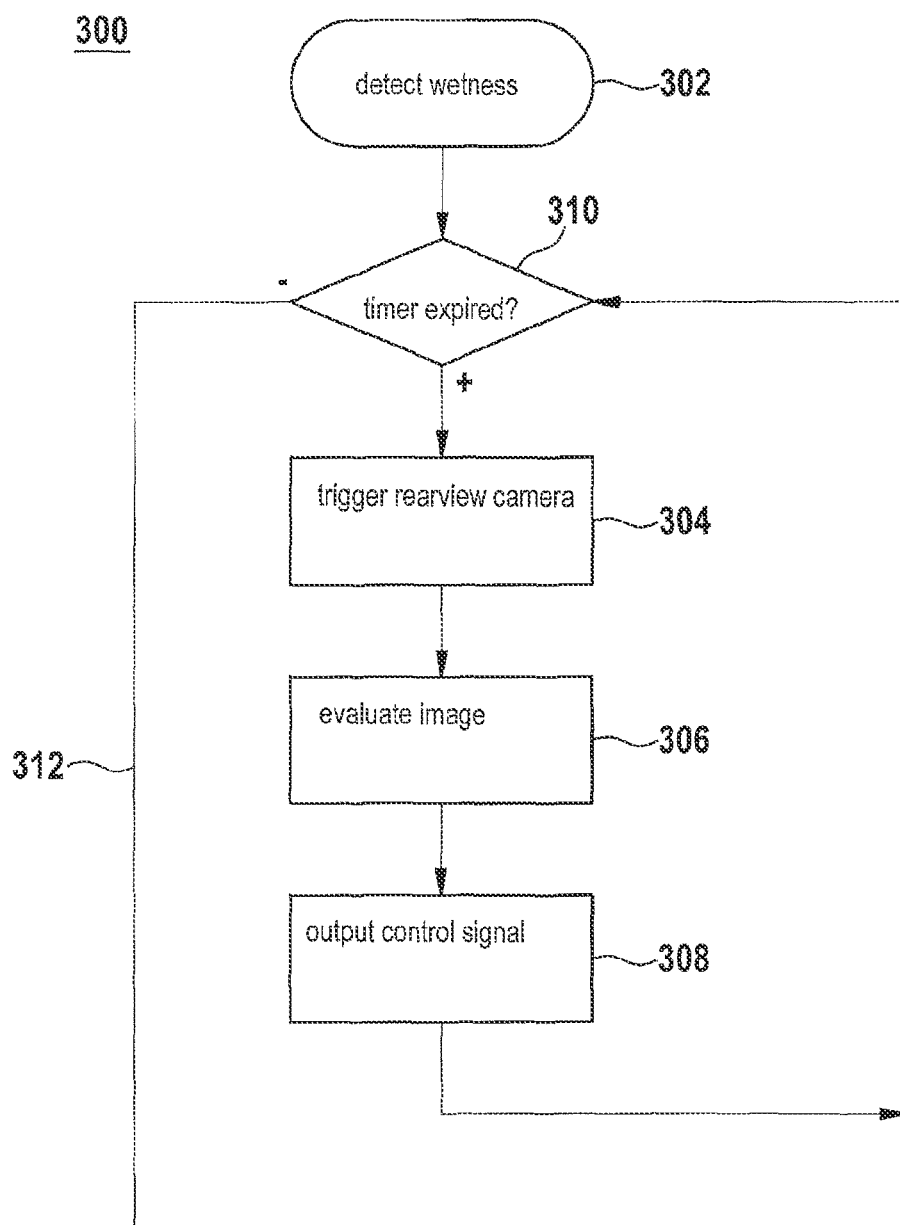
FIG. 3 shows a flow chart of a mode of operation of the driver assistance system from FIG. 2.

A mode of operation of ECU 108 in FIG. 2 is explained in greater detail below with reference to a flow chart 300 in FIG. 3. The method carried out here relates to a detection of wetness on a road surface 110 in the exemplary scenario of FIG. 1 as well as to control actions (302) which follow from this detection.

In step 304, component 202 triggers rearview camera 106 to record an image of area 118 located behind the rear end in the field of vision of rearview camera 106. The image may be recorded in response to the expiration of a timer 222, which is set for a period of one minute, for example, and is started by control component 202 as soon as vehicle 100 is moving forward sufficiently to develop spray trails 116 when road surface 110 is wet. This could be the case at a speed of 30 km/h or more, for example. Additionally or alternatively, control component 202 may also receive data from a rain sensor 224 and may set timer 222 accordingly. The detection of rain by sensor 224, for example, could cause rearview camera 106 to be operated at a higher or lower recording frequency.

In step 306, the image recorded by rearview camera 106 in step 304 is evaluated for the presence of spray. For this purpose, control component 202 transfers the image recorded by rearview camera 106 to evaluation component 204, which may then detect the presence of one or two spray trails in field of vision 118 of the camera, based on one or multiple of the processes outlined below. The processes as well as, if necessary, templates (models) for properties of a spray trail, such as coverage of background structures, contour and shape properties for identification of spray in an image, may be stored in an assigned memory area 205.

Component 204 may thus carry out an image recognition processes, in which there is a search for the presence of a spray trail in prior established areas of the image which are predefined by the position of the viewing angle of camera 108 with respect to the rear wheels of vehicle 100. Spray is characterized in that the view of background objects such as road surface 110, markings 112 and 114, following vehicles, etc., is partially or entirely concealed.

Furthermore, component 204 may also be designed for evaluating a sequence of images over a period of a few seconds, for example. The presence of a spray trail may be determined from a chronological sequence of images based on the variable extent, shape and/or contour of the spray over time, for example. Spray differs from fog or rain through a pattern of specific dynamic properties, for example, but also through short-term disturbances such as exhaust gas plumes, wisps of fog or the like.

In addition, control component 202 could also transfer data from speed sensor 226 to evaluation component 204 to determine an extent, shape and/or contour of a disturbance in the field of vision of camera 106 as a function of vehicle speed, for example, and to infer the presence of a spray trail therefrom. Data from speed sensor or wheel sensor 226 could also be used by control component 202 for a speed-dependent adjustment of timer 222 and thus of rearview camera 106.

Component 204 sends the result of the evaluation back to component 202. The result may relate to information about the presence of one or two spray trails 116, for example, at the rear end of the vehicle, as shown in FIG. 1. The result may also relate to information about the size and intensity of spray trails 116 or the amount of moisture or wetness on road surface 110 to be derived therefrom or even a change in these variables over time.

In step 308, control component 202 outputs at least one control signal 228, 230 to at least one subsystem 206, 208, 210. The control signal may be based on the result of the evaluation reported by component 204 to control component 202 with optional inclusion of the data from rain sensor 224. In a simple exemplary embodiment, control component 202 would output only a single control signal to all the downstream subsystems, but FIG. 2 shows that control component 202 may output different control signals 228, 230 to different subsystems.

For the purpose of this discussion, it is assumed that rain sensor 224 does not report any rain and that windshield wipers 214 are inactive at the present point in time, while the evaluation of the image recorded by camera 106 has revealed the presence of spray trails 116 as indicated in FIG. 1. In response to these signal inputs, control component 202 is not currently sending a control signal to subsystem 206, as indicated by dashed line 228. The absence of a control signal 228 means that the windshield wipers are still turned off.

It is possible that with simultaneous detection of rain and spray trails, for example, or in the case of highly pronounced spray trails, subsystem 206 might be prompted to output a warning to display 212. Such a warning may relate to the risk of hydroplaning, for example.

As another example of a response of subsystem 206 to receiving a control signal 228, it should be pointed out that on detection of rain, a spray trail and a low temperature (for example, control component 202 would take into account data from a temperature sensor not shown here), a control signal 216 could be delivered to an air-conditioning system, which would be configured to keep the windows of vehicle 100 free of condensation. A control signal 216 could also relate to, for example, turning on a rear fog light on the vehicle, which could be turned on if the spray trail became extremely pronounced, as long as this is allowed or prescribed by statutory regulations.

Control signal 230 is delivered identically to both stability controllers 208 and 210 (however, it is also conceivable that both systems 208 and 210 receive individual control signals, depending on the possible configurations of these controllers). Each system 208, 210 is then configured to trigger braking system 218 and engine system 220 of vehicle 100 under particular consideration of the wet condition of the road surface, if necessary, to maintain driving stability in the longitudinal direction and/or transverse direction.

Subsystem 210 relates to a vehicle dynamics control system in general, which also accesses an engine control unit 220 in addition to braking system 218 (e.g., reducing the driving power of a vehicle engine, if necessary) to thereby maintain the stability of vehicle 100. Subsystem 210 may thus be a subcomponent of an ESP system, such as, for example, an RSC (roll stability control), an engine drag torque control, a trailer stability assist (TSA) or the like. An ABS system as well as subsystems of an ESP system, which act only on braking system 218, such as an electronic brake assist (EBA), may be part of component 208.

Whereas traditional ABS and ESP controls often do not have any special settings for different road surface conditions, more advanced systems in the future will increasingly be adaptable accordingly. In this regard, automatic detection of the condition of the road surface will be important in particular. The present invention as presented here permits automatic adaptation of an ABS system 208 and/or an ESP system 210 to the condition of a road surface, for example.

In principle, the evaluation of images recorded by rearview camera 106 permits not only detection of wetness on the road surface but also detection of other conditions of the road surface such as, for example, a road partially or completely covered with snow, sludge and/or mud. Since in the future, a rearview camera will more frequently be available as equipment on a vehicle, no additional installations will be required for such automatic adjustments, provided that the required controls such as components 202 and 204 in FIG. 2 are implemented in software and/or firmware on an existing ECU or comparable processing component.

Since control component 202 in step 308 delivered no control signal or delivered one or multiple control signals 228, 230 to corresponding subsystems 206, 208 and 210, conditions which must be met for the method to be run through again cyclically are evaluated in block 310. The decision in block 310 may be prompted by renewed expiration of timer 222, for example. If it is found in the meantime that a vehicle speed, for example, is below a minimum speed, then the query is nevertheless repeated cyclically (arrow 312). This sequence may end when the driver assistance system is deactivated, for example, when the engine is turned off, and may be resumed automatically when the engine is started again, for example.

The present invention is not limited to the exemplary embodiments described here and the aspects emphasized herein, but instead numerous modifications within the scope of action by those skilled in the art are possible.

What is claimed is:

1. A method in a driver assistance system of a vehicle for detecting wetness on a road surface, the driver assistance system having a rearview camera, the method comprising:
   recording an image of an area located behind a rear end of the vehicle using the rearview camera;
   evaluating the recorded image to detect a presence of a spray trail caused by the vehicle; and
   selectively outputting, based on the evaluation, a wetness signal for triggering an automatic response by the driver assistance system to a wet road surface;

wherein the recording of the image is initiated in response to the arrival of a signal of a rain sensor.

2. The method as recited in claim 1, wherein the automatic response relates to at least one of the following vehicle components: windshield wipers, vehicle headlights, vehicle windows, and air-conditioning system.

3. The method as recited in claim 1, wherein the automatic response relates to at least one of the following subsystems of the driver assistance system: antilock braking system, traction control system, electronic stability program, electronic brake assistant, vehicle dynamic control systems, and electronic stability controls.

4. The method as recited claim 1, wherein the automatic response relates to an output of a warning to the driver that the wetness of the road surface has exceeded a predefined threshold value.

5. The method as recited in claim 1, wherein the recording of the image is initiated in response to a detection of at least one of the following events: reaching a regular time mark, and detection of a forward movement of the vehicle at a speed greater than a predetermined speed.

6. The method as recited in claim 1, wherein the spray trail caused by the vehicle is detected based on an evaluation of the image or a sequence of chronologically successive images recorded by the rearview camera, based on at least one of the following characteristics of a spray trail: local extent of the spray trail in contrast with a global influence on the image due to fog or rain, a change in at least one of an extent, shape, and contour over time; and at least one of an extent, shape, and contour which depend on a speed of the vehicle.

7. The method as recited in claim 1, wherein the output of the wetness signal takes place based on the evaluation of the image recorded by the rearview camera and of a signal of a rain sensor.

8. A non-transitory computer readable storage medium storing a computer program for a vehicle for detecting wetness on a road surface, the program, when executed by a computer unit, causing the computer unit to perform the steps of:
   recording an image of an area located behind a rear end of the vehicle using the rearview camera;
   evaluating the recorded image to detect a presence of a spray trail caused by the vehicle; and
   selectively outputting, based on the evaluation, a wetness signal for triggering an automatic response by the driver assistance system to a wet road surface;
   wherein the recording of the image is initiated in response to the arrival of a signal of a rain sensor.

9. A driver assistance system in a vehicle designed to detect wetness on a road surface, comprising:
   a rearview camera to record an image of an area located behind a rear end of the vehicle;
   a rain sensor to output a signal to initiate the rearview camera;
   a component to evaluate the recorded image for presence of a spray trailed by the vehicle; and
   a component to selectively output, based on the evaluation, a wetness signal to trigger an automatic response of the driver assistance system to a wet road surface.

* * * * *